Nov. 21, 1950     H. BAXTER ET AL     2,530,563
AUTOMATIC CONTROL FOR HEATING SYSTEMS Filed Aug. 19, 1947     10 Sheets-Sheet 1

*INVENTORS*
*HARRY BAXTER*
*JOHN L. MARKIS*
BY

Fig. 2

Nov. 21, 1950     H. BAXTER ET AL     2,530,563
AUTOMATIC CONTROL FOR HEATING SYSTEMS Filed Aug. 19, 1947     10 Sheets-Sheet 5

INVENTORS
HARRY BAXTER
JOHN L. MARKIS

Nov. 21, 1950   H. BAXTER ET AL   2,530,563
AUTOMATIC CONTROL FOR HEATING SYSTEMS
Filed Aug. 19, 1947   10 Sheets-Sheet 6

INVENTORS
HARRY BAXTER
JOHN L. MARKIS
BY

Nov. 21, 1950     H. BAXTER ET AL     2,530,563
AUTOMATIC CONTROL FOR HEATING SYSTEMS
Filed Aug. 19, 1947     10 Sheets-Sheet 7

INVENTORS
HARRY BAXTER
JOHN L. MARKIS
BY

Patented Nov. 21, 1950

2,530,563

UNITED STATES PATENT OFFICE 2,530,563

AUTOMATIC CONTROL FOR HEATING SYSTEMS

Harry Baxter, Garrettsville, and John L. Markis, Bristolville, Ohio

Application August 19, 1947, Serial No. 769,478

5 Claims. (Cl. 236—1)

This invention relates to heating systems and particularly to automatic unit control zone heating systems.

The primary object of this invention is to provide a controller for a zone control heating system that is an improvement over the controller disclosed in the application for Letters Patent of the United States, Serial No. 696,670, filed by us on September 13, 1946.

Another object is to provide a controller for a zone heating system that employs a single rotating selecting means for controlling the flow of heat to a plurality of zones.

A further object is to provide a motor driven controller that can make all the selections required to adjust the heating system to the particular momentary needs of the various zones during one revolution of the selector, after which the motor is automatically turned off.

Still another object is to provide a controller of the type stated that can be made as a compact self-contained unit that can be easily installed at any convenient place between the boiler and the various heat-exchangers of a conventional zone heating system.

A further object is to provide a controller for zone heating systems that is economical to manufacture, low in operating cost and easy to maintain.

These and other objects of the invention will become apparent from a reading of the following specification and claims, together with the accompanying drawings in which like parts are referred to and indicated by like reference characters and wherein:

Conducive to a better understanding of this invention, it may be well to point out that all zone control heating systems prior to that disclosed in our pending patent application, Serial No. 696,670, mentioned heretofore, required separate driving means for each zone control valve.

Our original controller was developed to replace the multiple valve driving units, heretofore required, with a single driving unit that would operate any number of valves in response to the heating requirements of a plurality of zones. Our original zone heating system employed a plurality of linearly spaced valves operated by a single reciprocating selector.

The instant device was developed to provide a novel and improved controller that combines compactness of structure with simplicity of operation. The valves being arranged in a circle, with a central selecting arm that employs a simple rotating action to operate any one or all of the valves.

Figure 1:
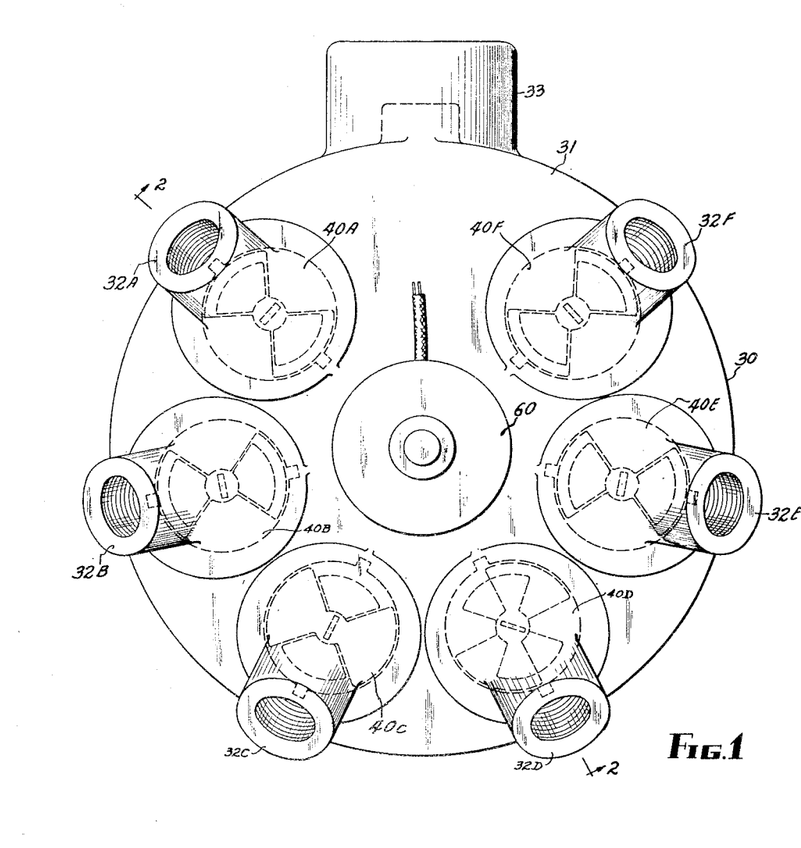
Figure 1 is a top view of a controller for a zone heating system made in accordance with this invention.
Figure 2:
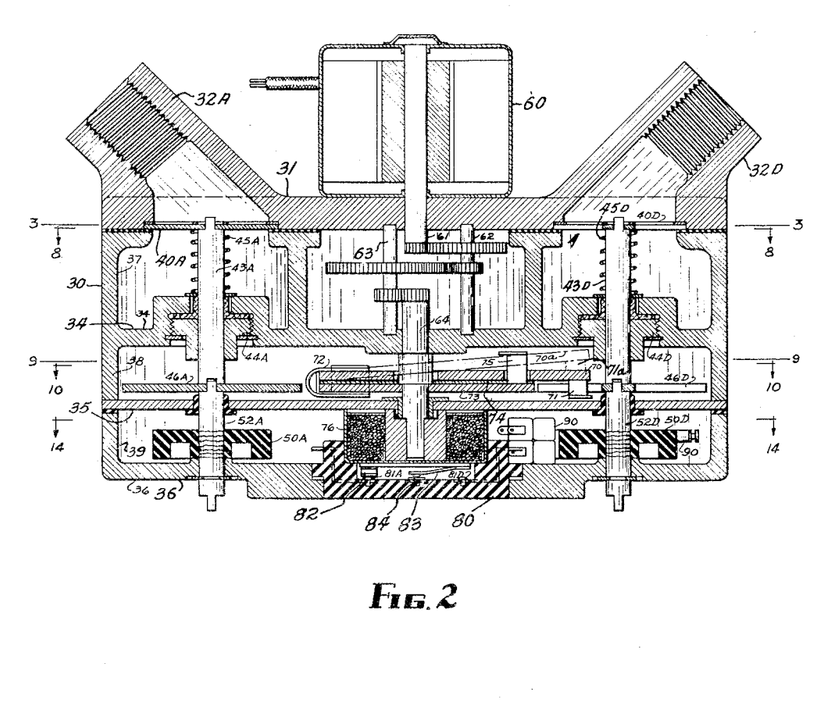
Figure 2 is a cross-sectional view of the controller taken substantially along the line and in the direction of the arrows 2—2 of the Figure 1.
Figure 3:
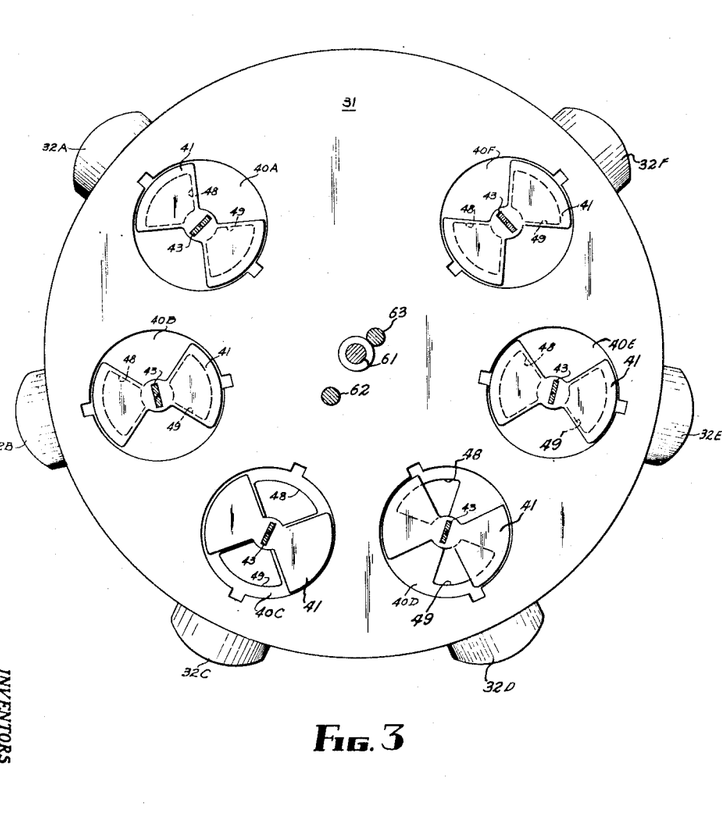
Figure 3 is a view of the manifold valve taken along the line 3—3 of the Figure 2.
Figure 4:
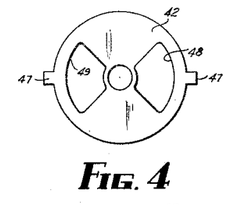
Figure 4 is a plan view of one of the valve seat disks.
Figure 5:
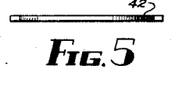
Figure 5 is a front view of the valve seat disk illustrated in the Figure 4.
Figure 6:
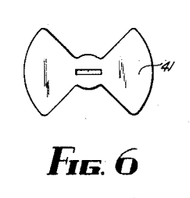
Figure 6 is a plan view of one of the valve gates.
Figure 7:
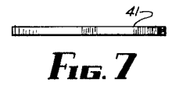
Figure 7 is a front view of the valve gate illustrated in the Figure 6.
Figure 8:
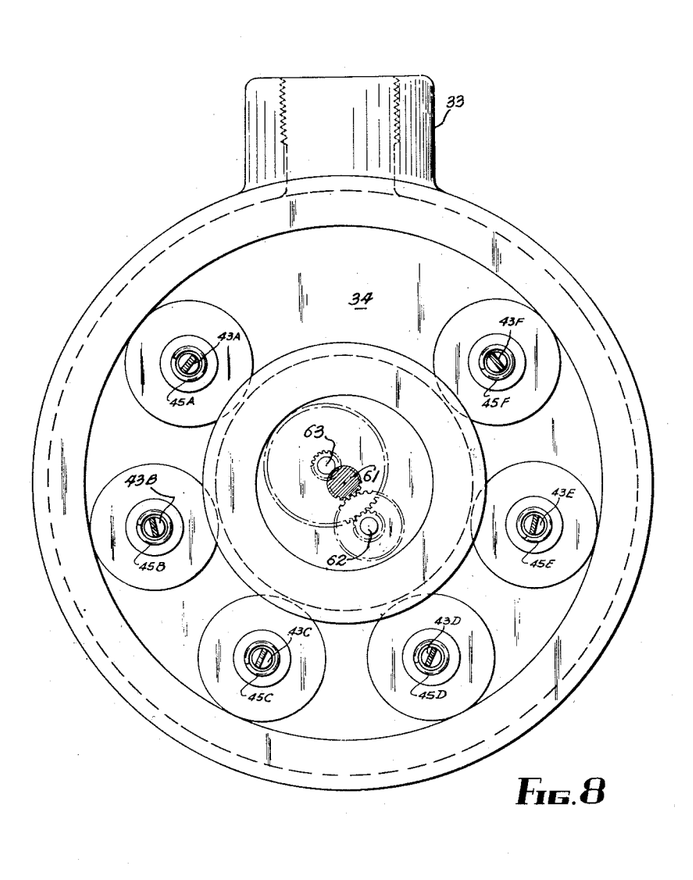
Figure 8 is a view taken substantially along the line and in the direction of the arrows 8—8 of the Figure 2.
Figure 9:
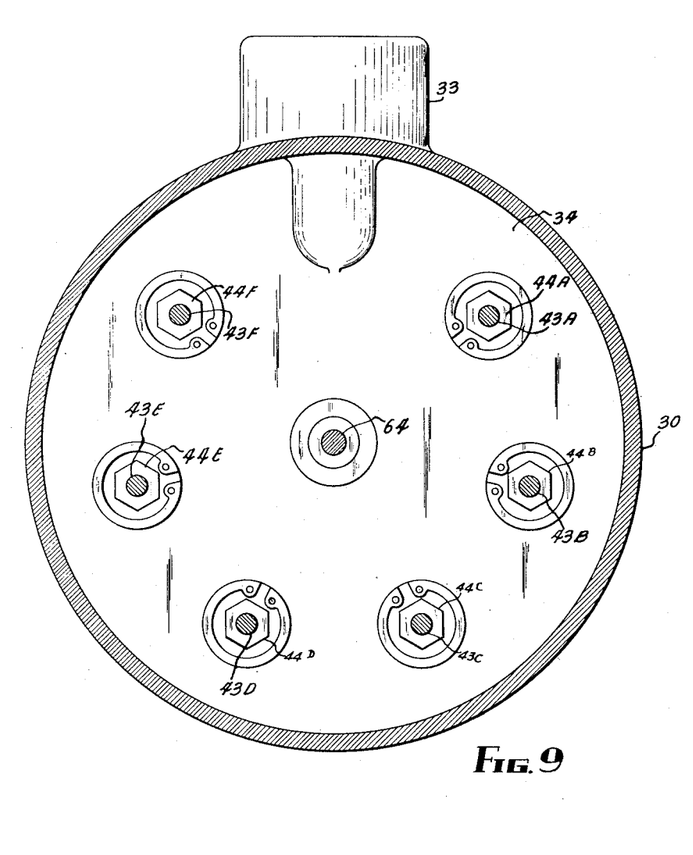
Figure 9 is a view taken along the line 9—9 of the Figure 2.

Referring to the Figures 1 and 2, there is shown a top and cross-sectional view respectively, of a controller for a zone heating system, made in accordance with this invention.

The controller is in the form of a cylindrical case 30 which is divided by the transverse walls 34 and 35 into a first compartment or manifold 37, a second compartment 38 containing the valve operating cams 46 and the selector 70, and a third compartment 39 containing the electric switches 90 and their associated cams 50.

The upper or first compartment contains an annular manifold which receives the heating fluid thru the intake 33 and distributes it to the various zones thru the outlet ports 32—A, 32—B, 32—C, 32—D, 32—E and 32—F. The controller illustrated is intended for use in controlling six zones which have been designated by the reference characters A, B, C, D, E and F. Since many of the parts are duplicates of one another, differing only as to their location in a particular zone system, such parts have been further characterized and distinguished by the addition of exponents corresponding to the particular zone system of which they form a part.

The ports are radially spaced around the annular manifold and each port is controlled by a valve 40. Each valve comprises a value seat in the form of a steel disk 42 which is force fitted into a hole in the top of the manifold. Two ears 47 prevent the seat from turning. Two V-shaped openings 48 and 49 are cut in the seat, which serve as passageways for the heating fluid.

A valve stem 43 is mounted in the valve stem bearing 44. An hour-glass shaped disk valve 41 is mounted on the stem 43. The spring 45 holds the valve head or gate 41 in close sliding engagement with the seat 42. The shape of the head is such that it will cover the valve seat openings 48 and 49 when in a first position and will completely uncover the valve seat openings 48 and 49 when in a second position as shown in Figures 1, 2, 3, 4, 5, 6 and 7. A steel valve cam 46 shaped like a Geneva wheel is secured to the end of the valve stem 43 below the transverse wall 34 in the valve operating compartment 38 as shown in the Figures 2, 10, 11, 12 and 13.

A soft iron selector arm shaft 64 is vertically positioned at the center of the circle drawn thru the center lines of all of the control valves 40. The lower end of the selector shaft 64 extends into the lower compartment 39 and a coil of wire which forms the electromagnet 76 is wound around the lower end of the soft iron shaft. A bed plate 73, also of soft iron, is rigidly secured at right angles to the longitudinal axis of the shaft.

Figure 10:
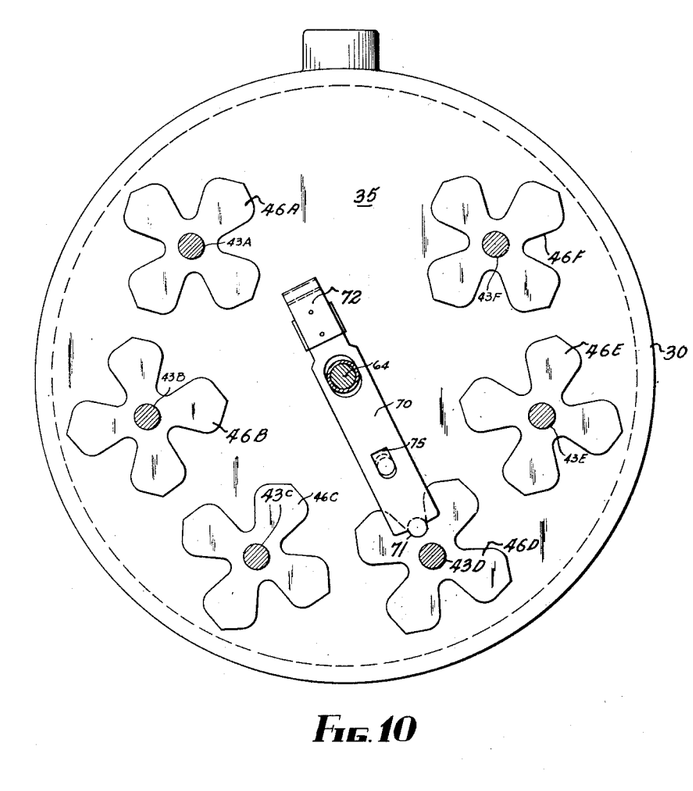
Figure 10 is a view of the valve operating cams and the selector arm taken substantially along the line and in the direction of the arrows 10—10 of the Figure 2.
Figure 11:
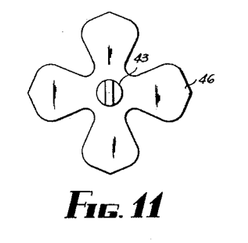
Figure 11 is a plan view of one of the valve stems and valve operating cam.
Figure 12:
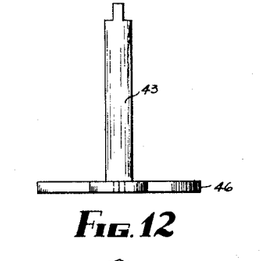
Figure 12 is a front view of the valve stem and cam shown in the Figure 11.
Figure 13:
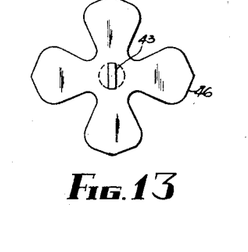
Figure 13 is a bottom view of the cam illustrated in the Figure 12.

A selector arm 70, also of soft iron, has a slot thru which the selector shaft 64 passes, as shown in Figures 2 and 10. One end of the selector arm 70 is connected to one end of the bed plate 73 through a bent flat spring 72. The spring 72 tends to force the free end 71 of the selector 70 up and away from the bed plate 73. A stop 75 limits the upward travel of the selector arm 70 as shown in Figures 2 and 10. The end 71 of the selector arm is peg-like in shape and is capable of engaging the slots of the valve cams 46. A strip of non-magnetic material 74, such as hard rubber, rests on the bed plate between it and the selector arm 70.

When the magnet coil 76 is energized, the shaft and bed plate become one pole of an electromagnet and the selector arm 70 is strongly attracted to the bed plate 73 against the upward force of the spring 72. This causes the selector arm 70 to lie parallel to the bed plate, in which position it engages the slots of successive valve cams 46 as the selector shaft 64 is rotated. When the magnet coil 76 is unenergized, the spring 72 forces the selector arm away from the bed plate and against the limit stop 75. The selector arm now is in position 70a as shown in Figure 2 and lies at an acute angle with the bed plate 73. The peg is now in its alternate position designated by reference character 71a and will pass by all the valve cams 46 when the selector arm shaft 64 is rotated.

The selector arm shaft 64 is connected to the controller motor 60 thru a train of speed reducing gears which are mounted on the shafts 61, 62 and 63 as shown in the Figure 2. The ratio of the gears should be such that the selector arm shaft will rotate about three or four revolutions per minute.

A distributor switch 80 of molded die-electric material has a switch point 81 for each zone. A common pick-up arm 83 picks up current from a center contact point 84 and a selective pick-up arm 82 picks up current from the several zone switch points 81—A, 81—B, 81—C, 81—D, 81—E and 81—F, respectively. This switching arrangement permits the magnet coil 76 to rotate with the selector arm shaft 64 and still be in proper electrical association with the various zone thermo-electric circuits.

Figure 15:
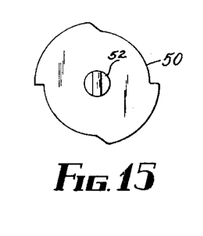
Figure 15 is a top view of one of the switch cams and cam shaft.
Figure 16:
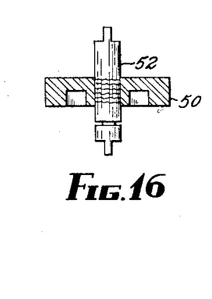
Figure 16 is a front view, partly in section, of the cam and shaft illustrated in the Figure 15.
Figure 17:
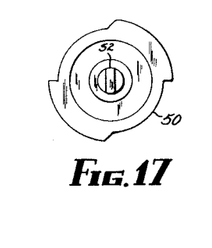
Figure 17 is a bottom view of the cam and shaft illustrated in the Figure 15.
Figure 18:
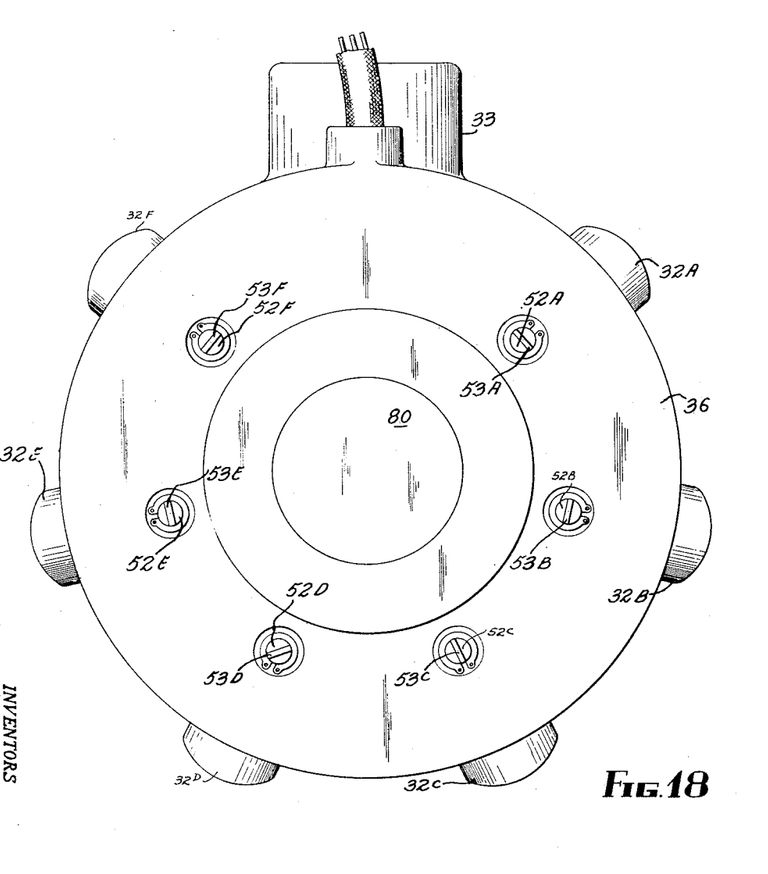
Figure 18 is a bottom view of the controller.

A switch cam 50 for each zone is located in the lower compartment 39. This cam is of molded dielectric material, shaped to have a small and a large diameter as shown in the Figures 15, 16 and 17. Each cam is mounted on a cam shaft 52 which is keyed to the lower end of the valve stem 43 of its particular zone, as shown in Figure 2. The lower end of each switch cam shaft is mounted in the bottom plate 36 of the controller case, with a second keyed end protruding thru the bottom of the case, where it can be reached by a wrench. This permits the valves to be operated manually in case of a breakdown in the electric service to the building being heated.

Figure 14:
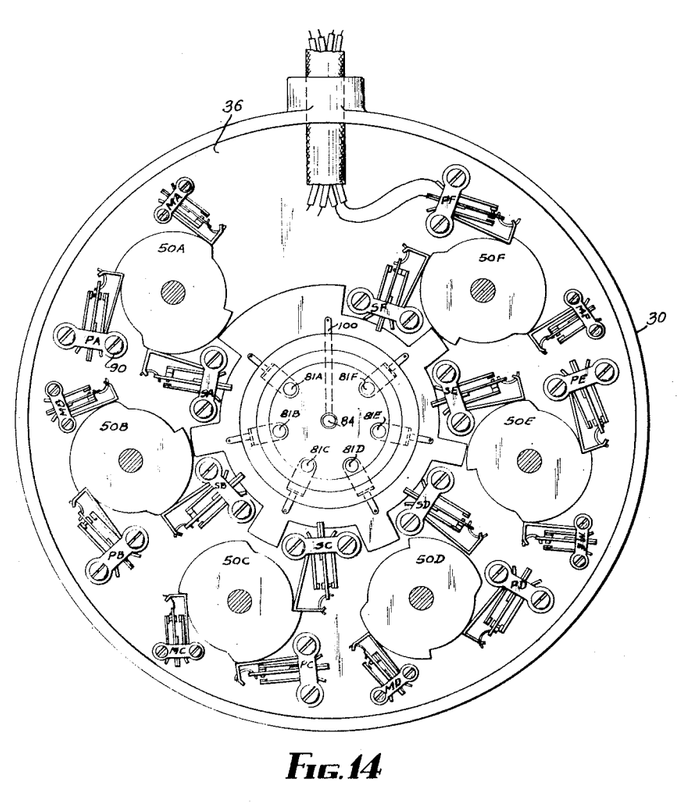
Figure 14 is a view of the controller motor, pump motor and selector magnet switches and cams taken substantially along the line and in the direction of the arrows 14—14 of the Figure 2.
Figure 20:
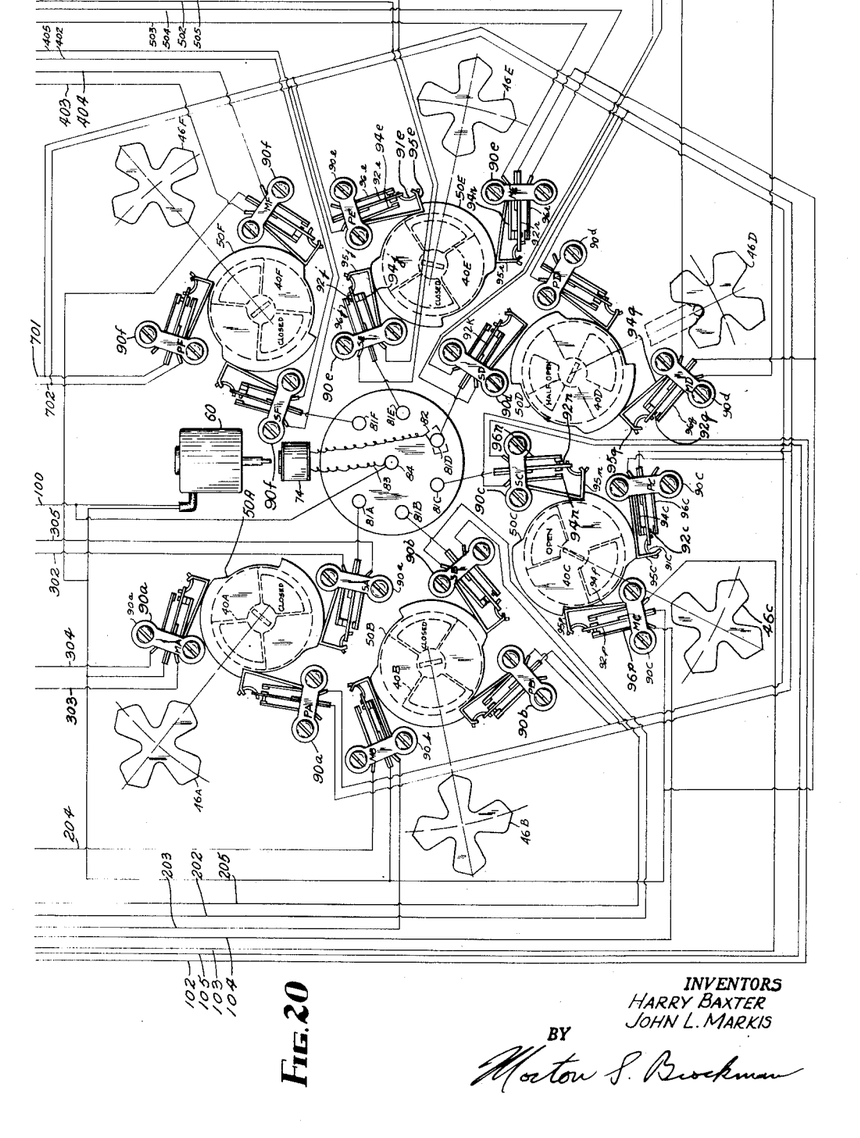
Figure 20 is a schematic wiring diagram of the controller half of the zone control electrical system.

There are three switches associated with each switch cam 50, designated by reference letters P, M and S, which form parts of the pump motor 100, controller motor 60 and electromagnet 76 circuits, respectively, as shown in Figures 2, 14 and 20.

Each switch has a base or frame 90 on which is mounted a center contact arm 92, a lower contact arm 94 and an upper contact arm 96. A switch controller arm 95 rides on the irregular peripheral surface of the switch cam 50 and is connected to the center contact arm 92 thru a curved spring 91 which acts to throw the center contact arm into contact with the lower contact arm 94 when the switch controller arm 95 rides on the large diameter of the cam and into contact with the upper contact arm 96 when the switch controller arm 95 rides on the small diameter of the switch cam, as shown in Figures 14 and 20. All the cam switches have the same construction and the additional lower case letters associated with each reference character are merely added for the purpose of making it easier to follow the explanation of the operation of the several electric circuits as described hereinafter.

The zone heating system controller illustrated in these drawings is intended for use with a six-zone hot water heating system of the type illustrated in our co-pending patent application, Serial No. 696,670, filed September 13, 1946. The manifold inlet 33 is connected to a conventional hot water boiler and the radiators of zones A, B, C, D, E and F are connected to the manifold ports 32—A, 32—B, 32—C, 32—D, 32—E and 32—F, respectively.

Figure 19:
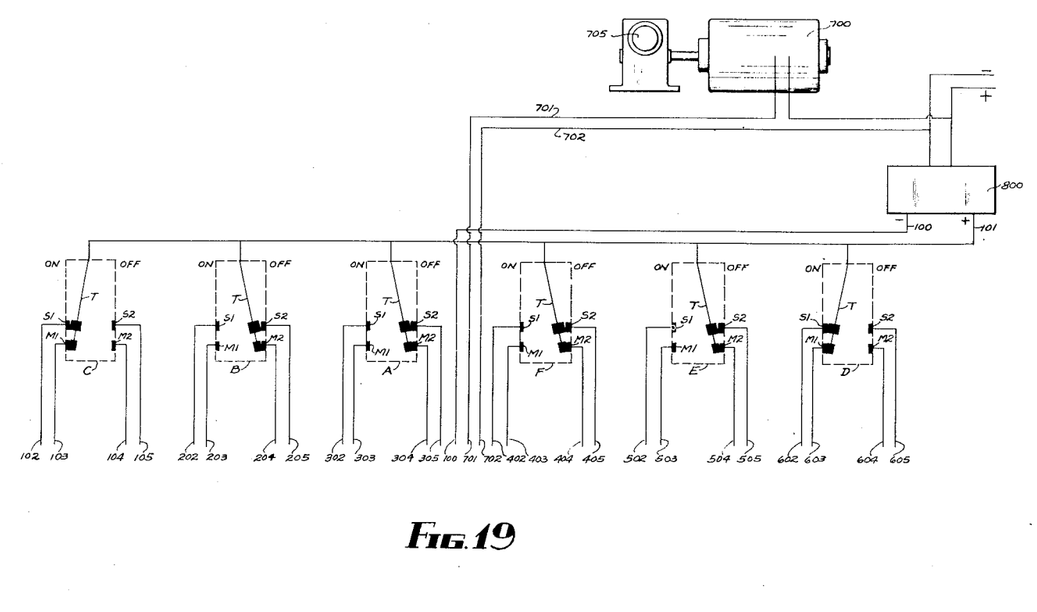
Figure 19 is a schematic wiring diagram of the thermostat half of the zone control electrical system.

Figures 19 and 20 are to be read together and the numbered leads of Figure 19 are to be considered as being joined to the leads in Figure 20, bearing the corresponding numbers. Figure 19 shows six zone thermostats bearing the reference letters A, B, C, D, E and F. Each zone thermostat has two contacts, S—1 and M—1, on the "on" side and two contacts, S—2 and M—2 on the "off" side, with a center, heat actuated, element T which travels between the "on" and the "off" contacts in the conventional manner. The thermostats are connected to a 24-volt transformer 800 as shown in the Figure 19.

Reference character 700 represents an electric motor which drives the water pump 705. The water pump 705 serves to circulate the hot water thru the heating system in the conventional manner.

An illustration of the opening of one valve will be given by referring to the wiring diagrams of Figures 19 and 20. Valve 40—E is in a closed position and the thermostat E is in its "off" position as will be noted. The positive 24-volt current flowing from the transformer 800 thru wire 101 to the thermostat E thru the center heat actuated element T, touches the contacts at S—2 and M—2 on the "off" side of the thermostat. By following wire 505 on the "off" side from thermostat E, we find that it runs to contact 96j and there the electric current is dead and cannot flow thru to contact 92j and on to 81—E to energize the magnet coil 74. But 92j is making contact with 94j and is ready to send current to 81—E to energize the magnet coil 74 as soon as the thermal element in the thermostat E moves to its "on" position and sends current thru contact S—1 of the "on" position of thermostat E and then thru wire 502.

It will also be noted that the positive current flowing in wire 101 thru thermostat E is also flowing thru contact M—2 in the thermostat, and by following the current from contact M—2 of the thermostat E on the "off" position, we find that the current passes thru wire 504 to contact 96r of switch M—E, which is the controller motor, 60, switch. Contact 92r of switch M—E is not making contact with 96r, so that no current is going to the controller motor. However, contact 92r is connected to 94r and is ready to send current to the controller motor when the thermal element on the thermostat E changes to the "on" position, when it will pass current thru contact M—1 and wire 503.

Now, when the thermal element calls for heat and is actuated as shown in thermostat D, it will be noted that the current flows into contact S—1 on the "on" position of the thermostat D. From there, it flows thru wire 602 to contact 94k of switch S—D on switch cam 50—D, from contact 94k is flows thru contact 92k and on to 81—D of the distributor. When the distributor arm 82 reaches this point, 81—D, it will pick up current and the magnet coil 74 will be in operation as will be described hereinafter. Going back to thermostat D, it will be noted that current is also flowing into contact M—1, which in turn is sending current thru wire 603 to contact 94q of switch M—D of switch cam 50—D, and from there flows to 92q. From 92q, it goes to the controller motor 60 and starts up the controller motor. Before going any further, note that the switches S—D, P—D and M—D are in the same position on switch cam 50—D of valve 40—D as they are of cam 50—E of valve 40—E which is in its closed position.

Now the motor is running and turning the shaft 64 with the selector arm 70 and also the electro-magnet coil 74 with the rotary distributor. When the distributor arm 82 of the magnet picks up current at switch point 81—D, it will magnetize the bed plate 73 and bring selector arm 70 down so that pin or finger 71 will engage the Geneva valve cam 46—D of valve 40—D, as shown in Figure 10. In doing this, selector arm pin 71 rotates switch cam 50—D on which the operating arms of switches S—D, P—D and M—D of valve 40—D ride, as seen in the electrical layout sketch of Figure 20. Since current is flowing to the controller motor and to the magnet, the cam 50—D is being rotated as shown in Figure 20. The valve 40—D is opening and when it is completely open, the switches will assume the position shown at the cam 50—C of valve 40—C.

The position of contact 92k on switch S—D will be the same as the position of contact 92n on switch S—C of valve 40—C, and therefore the flow of current to the electro-magnet is stopped and the magnet will not operate. The selector arm 70 will again assume the normal tilted position designated by reference character 70a, in which position it cannot engage any of the valve operating cams.

When valve 40—D is completely opened, the position of contact 92q on valve 40—D will be the same as the position of contact 92p of switch M—C of valve 40—C, and therefore no current will flow to the controller motor and the motor will stop running after the valve is opened. Switches P—A, P—B, P—C, P—D, P—E and P—F are for the operation of the water pump motor 700, and when a valve is in its open position, the circuit is closed and current flows to the pump motor. It will be seen that valve 40—E is in its closed condition; valve 40—D is in the process of opening; and valve 40—C is completely open.

Now, to close valve 40—C, merely assume that the thermal element of thermostat C goes back to the "off" position and then follow the flow of electrical current and it will be seen that the controller motor 60 will be started again, the magnet coil 74 will become energized and the selector arm 70 will be drawn down parallel to the bed plate 73. The selector arm peg 71 will engage the valve cam 46—C. This will rotate the cam 50—C until the switches engaged with cam 50—C are in such position that no current will flow to either the controller motor 60 or the electro-magnet 74. When this takes place, the valve 40—C will again be in its closed position and the pump motor will stop if all the other valves are closed.

The pump motor will continue to run as long as one valve is open. When all the valves are in their closed positions, the pump motor will stop.

If the controller is to be used with a heating system that uses no circulating pump, such as thermal or gravity flow hot water heating systems, the pump motor switches may be eliminated.

The simplicity of the operation of our improved controller will not be apparent. Instead of a reciprocating selector, we now use a simple rotary selector that requires only one revolution to actuate all the valves, after which the driving motor is turned off, thus materially lengthening the life of the moving parts and greatly reducing the cost of operation.

It should also be noted that by dividing the controller case into three separate compartments, with water tight gaskets and bushings between each compartment, the danger of damaging the electrical switching circuits due to leaking valves is entirely eliminated.

It will now be clear that there is provided a device which accomplishes the objectives heretofore set forth. While the invention has been disclosed in its preferred form, it is to be understood that the specific embodiment thereof as illustrated and described herein is not to be considered in a limited sense as there may be other forms or modifications of the invention which should also be construed to come within the scope of the appended claims.

We claim:

1. In combination with a multiple zone heating system of the type having a source of heated fluid and radiators located in each of said zones and also having a thermostat for each zone, a control apparatus comprising, an annular manifold positioned between the said source and radiators and having an intake connected to the said source and having a plurality of radially spaced ports connected to the said radiators, each of the said ports having a valve therein, each of the said valves having a cam thereon, all of the said cams lying in the same plane; a revolvable shaft mounted on the manifold and having an arm hingedly mounted thereon extending radially therefrom and movable therewith on the plane of the cams when in a first position and movable therewith off the plane of the cams when in a second position, the said arm being capable of engaging and turning any of the said cams when in the first position, thereby opening or closing the engaged cam valve; an electrically operated means connected to the said arm and capable of moving it to either its first or second position; and a control circuit connected to each of the aforesaid thermostats and also connected to the electrically operated means whereby a valve will be opened or closed regulating the flow of heated fluid through a radiator in the zone of the controlling thermostat.

2. In combination with a multiple zone heating system of the type having a source of heated fluid and radiators located in each of the said zones and also having a thermostat for each zone, a control apparatus comprising an annular manifold positioned between the said source and radiators and having an intake connected to the said source and having a plurality of radially spaced ports connected to the said radiators, each of the said ports having a disk valve therein, each of the said valves having a disk cam thereon, all of the said cams lying in the same plane; a revolvable shaft mounted on the manifold and having an arm hingedly mounted thereon extending radially therefrom and movable therewith on the plane of the cams when in a first position and movable therewith off the plane of the cams when in a second position, the said arm being capable of engaging and turning any of the said cams when in the first position, thereby opening or closing the engaged cam valve; an electrically operated means connected to the said arm and capable of moving it to either its first or second position; and a control circuit connected to each of the aforesaid thermostats and also connected to the electrically operated means whereby a valve will be opened or closed regulating the flow of heated fluid through a radiator in the zone of the controlling thermostat.

3. In combination with a multiple zone heating system of the type having a source of heated fluid and radiators located in each of the said zones and also having a thermostat for each zone, a control apparatus comprising, an annular manifold positioned between the said source and radiators and having an intake connected to the said source and having a plurality of radially spaced ports connected to the said radiators, each of the said ports having a disk valve therein, each of the said valves having a disk cam thereon, all of the said cams lying in the same plane and equidistant from the center of the said manifold; a revolvable shaft centrally mounted on the manifold and having an arm hingedly mounted thereon extending radially therefrom and movable therewith on the plane of the cams when in a first position and movable therewith off the plane of the cams when in a second position, the said arm being capable of engaging and turning any of the said cams when in the first position, thereby opening or closing the engaged cam valve; an electrically operated means connected to the said arm and capable of moving it to either its first or second position; and a control circuit connected to each of the aforesaid thermostats and also connected to the electrically operated means whereby a valve will be opened or closed regulating the flow of heated fluid through a radiator in the zone of the controlling thermostat.

4. In combination with a multiple zone heating system of the type having a source of heated fluid and radiators located in each of the said zones and also having a thermostat for each zone, a control apparatus comprising, an annular manifold positioned between the said source and radiators and having an intake connected to the said source and having a plurality of radially spaced ports connected to the said radiators, each of the said ports having a disk valve therein, each of the said valves having a cross-shaped cam thereon, all of the said cams lying in the same plane and equidistant from the center of the said manifold; a revolvable shaft centrally mounted on the manifold and having an arm hingedly mounted thereon extending radially therefrom and movable therewith on the plane of the cams when in a first position and movable therewith off the plane of the cams when in a second position, the said arm having a single finger capable of engaging and turning any of the said cams when the arm is in its first position, thereby opening or closing the engaged cam valves and capable of passing by any of the said cams when the arm is in its second position; an electrically operated means connected to the said arm and capable of moving it to either its first or second position; and a control circuit connected to each of the aforesaid thermostats and also connected to the electrically operated means whereby a valve will be opened or closed regulating the flow of heated fluid through a radiator in the zone of the controlling thermostat.

5. In combination with a multiple zone heating system of the type having a source of heated fluid and radiators located in each of the said zones and also having a thermostat for each zone, a control apparatus comprising, a case having top, side, and bottom walls and two spaced transverse inner walls forming upper, middle, and lower watertight compartments, the said upper compartment being further divided by a vertically extending circular partition into an annular manifold and a cylindrical gear box concentric therewith and hydraulically sealed therefrom by a gasket seated between the said top wall and the circular partition; the said annular manifold having an intake connected to the said source and a plurality of radially spaced ports connected to the said radiators, each of the said ports having a valve mounted therein, each of the valves having a first cam thereon positioned in the middle compartment and a second cam thereon positioned in the lower compartment, all of the said first cams lying in the same plane, each of the second cams having circuit control switches associated therewith; a motor mounted on the top wall and connected to a train of gears mounted in the said gear box; a revolvable shaft journalled in the transverse walls of the said case and connected to the said gear train, the said shaft having a magnetically sensitive arm hingedly mounted thereon extending radially therefrom and movable therewith on the plane of the first cams when in first position and movable therewith off the plane of the said first cams when in a second position, the said arm being capable of engaging and turning any of the same first cams when in the first position, thereby opening or closing the engaged cam valve and resetting the second cam switch; an electromagnet mounted on the shaft in the lower compartment and connected to the said magnetically sensitive arm and capable of moving it to either its first or second position; and a control circuit connected to each of the aforesaid thermostats and also connected to the motor, electro-magnet and the second cam switches whereby a valve will be opened or closed regulating the flow of heated fluid through the radiator in the zone of the controlling thermostat.

HARRY BAXTER.
JOHN L. MARKIS.

REFERENCES CITED

The following references are of record in the file of this patent:

UNITED STATES PATENTS

| Number    | Name   | Date          |
|-----------|--------|---------------|
| 2,030,543 | Ross   | Feb. 11, 1936 |
| 2,113,869 | Atkins | Apr. 12, 1938 |
| 2,153,382 | Martin | Apr. 4, 1939  |
| 2,457,017 | Walley | Dec. 2, 1948  |